United States Patent [19]

Brede, III

[11] 3,807,805
[45] Apr. 30, 1974

[54] VEHICLE WHEEL
[75] Inventor: Alexander Brede, III, East Lansing, Mich.
[73] Assignee: Motor Wheel Corporation, Lansing, Mich.
[22] Filed: Nov. 29, 1971
[21] Appl. No.: 202,799

[52] U.S. Cl. .................................................. 301/65
[51] Int. Cl. ............................. B60b 3/02, B60b 3/06
[58] Field of Search ...... 301/65, 64 R, 64 SD, 9 DP

[56] References Cited
UNITED STATES PATENTS

| 1,635,490 | 7/1927  | Meldrum  | 301/65      |
|-----------|---------|----------|-------------|
| 2,242,986 | 5/1941  | Zipper   | 301/65      |
| 2,631,897 | 3/1953  | Ewart    | 301/65      |
| 3,549,205 | 12/1970 | Reid     | 301/65      |
| 3,635,529 | 1/1972  | Nass     | 301/65      |
| 3,659,901 | 5/1972  | Porsche  | 301/65      |
| 51,236    | 9/1917  | McCuen   | DIG. 14/30 R |
| 197,840   | 3/1964  | Deaver   | DIG. 14/30 R |
| 199,054   | 9/1964  | Golata   | DIG. 14/30 R |
| 206,432   | 12/1966 | Reid     | DIG. 14/30 R |
| 1,388,910 | 8/1921  | Worth    | 301/64 R    |

FOREIGN PATENTS OR APPLICATIONS

| 163,746 | 8/1933  | Switzerland | 301/9 DP  |
|---------|---------|-------------|-----------|
| 685,828 | 12/1939 | Germany     | 301/64 SD |

Primary Examiner—Richard J. Johnson
Assistant Examiner—Reinhard Eisenzopf
Attorney, Agent, or Firm—Barnes, Kisselle, Raisch & Choate

[57] ABSTRACT

A vehicle wheel with an outer rim adapted for mounting a pneumatic tire thereon and a wheel disc or spider having an outer band with an open latticework of non-radially extending ribs connected to a center ring by an inner band of ribs. The wheel is mounted on a vehicle hub by a plurality of circumferentially spaced mounting holes in webs extending between the ribs of the inner band.

16 Claims, 6 Drawing Figures

INVENTOR
ALEXANDER BREDE III
BY Barnes, Kisselle, Raisch & Choate
ATTORNEYS

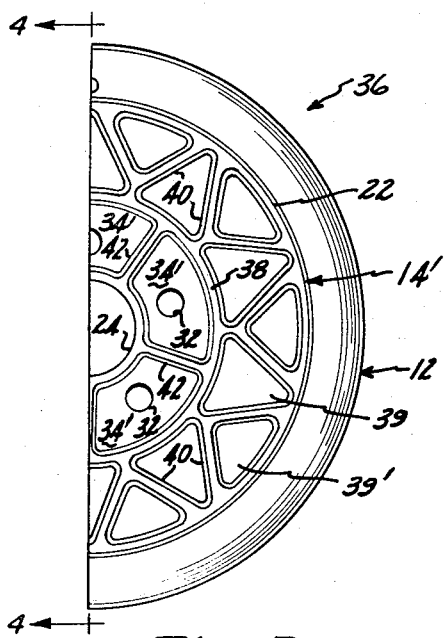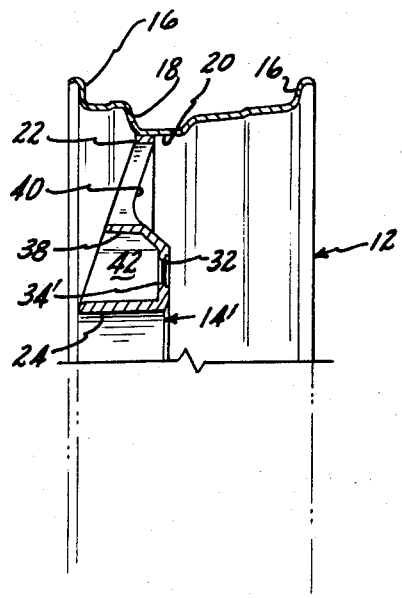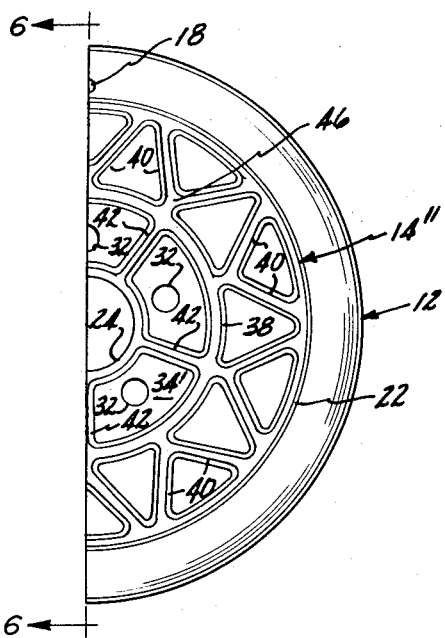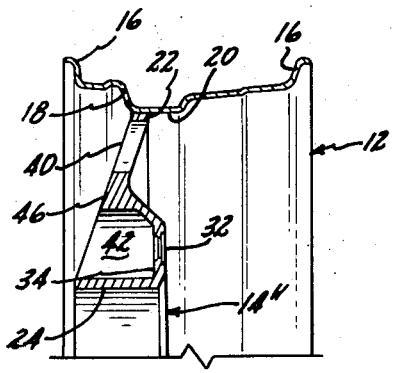

VEHICLE WHEEL

This invention relates to wheels and more particularly to vehicle wheels adapted to be removably attached to a wheel hub of automobile or the like by a plurality of circumferentially spaced fasteners.

Objects of this invention are to provide a vehicle wheel with improved torsional and axial loading characteristics and increased impact resistance which also is of economical manufacture and assembly.

These and other objects, features, and advantages of this invention will be apparent from the following description, appended claims, and accompanying drawings in which;

FIG. 3 is a half side elevational view of a modified vehicle wheel embodying this invention.

FIG. 4 is a vertical sectional view taken on line 4—4 of FIG. 3.

FIG. 5 is a half side elevational view of another wheel embodying this invention.

FIG. 6 is a vertical sectional view taken on line 6—6 of FIG. 5.

Figure 1:
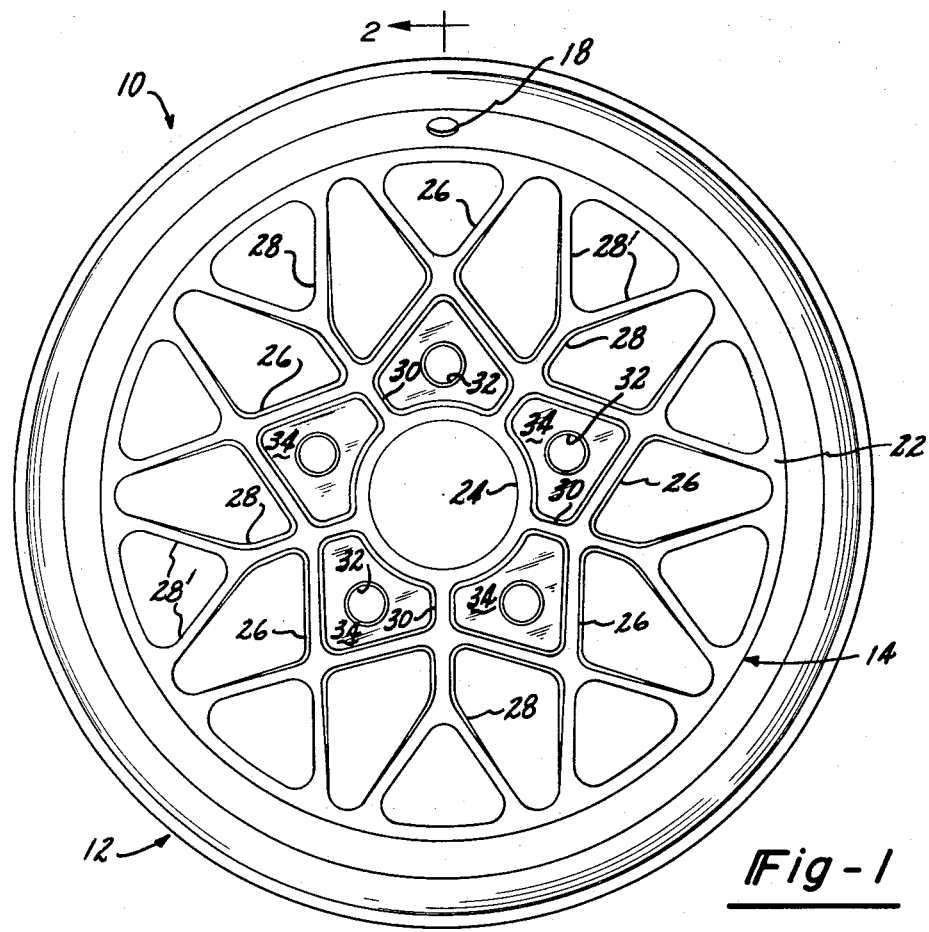
FIG. 1 is a side elevation of a vehicle wheel embodying this invention.
Figure 2:
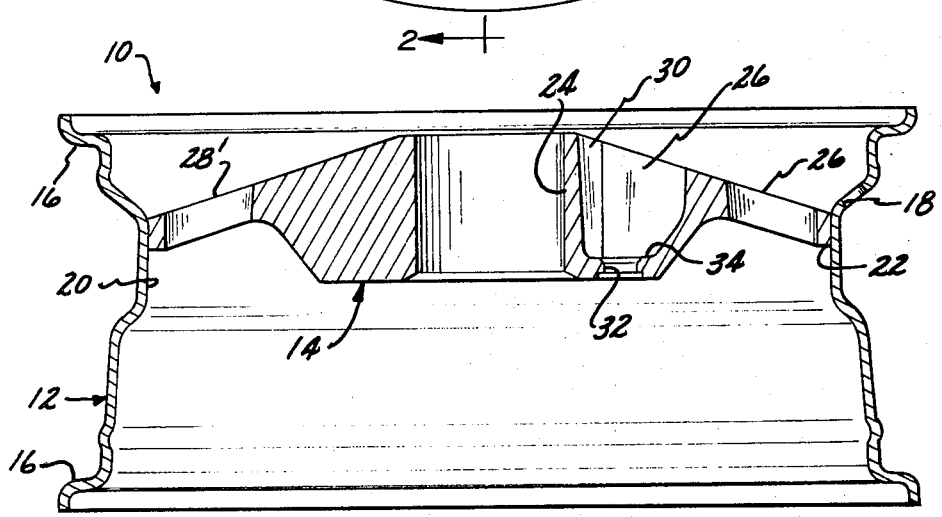
FIG. 2 is a vertical sectional view taken on line 2—2 of FIG. 1.

Referring in more detail to the drawings FIGS. 1 and 2 illustrate a wheel 10 embodying this invention with a rim 12 and a disc or spider 14. Rim 12 preferably comprises a conventional drop-center rolled steel rim having the usual pair of tire bead retaining flanges 16 adapted for mounting a tubeless pneumatic tire thereon, a valve stem hole 18 and a central well portion 20. Disc or spider body 14 has an outer ring 22 which is axially received with a press fit in well 20 of rim 12 and a coaxial center ring 24 of sufficient inside diameter to provide clearance for the bearing housing of a conventional hub of an automobile front wheel (not shown).

Disc or spider 14 has an outer circumferential band of alternating "X" ribs 26 and "Y" ribs 28 forming an axially open latticework of ribs integrally connected to outer ring 22. An inner circumferential band of ribs 30 integrally interconnects the outer band of ribs and center ring 24. The torsional strength of wheel 10 is increased by the "X" ribs 26 being oriented so as to extend longitudinally in a direction non-radially of the axis of wheel 10, and likewise as to wing portions 28' of "Y" ribs 28 in the outer circumferential band, because torsional loading of wheel 10 stresses these ribs in tension and compression, as contrasted with conventional radially extending ribs or spokes of wheels wherein pure bending moments are produced by torsional loading of the wheel. Wheel 10 is connected to the hub of the vehicle (not shown) through five circumferentially spaced bolt holes 32 each centered in an associated one of the integrally connected webs 34 which extend in a flat radial plane between ribs 30 and the innermost arms of "X" ribs 26 adjacent their inboard edges. The outer band of non-radial ribs 26 and 28' is thus supported by an inner webbed band of ribs 30 which provides a wheel with increased impact resistance. As shown in FIG. 2, the axial thickness of webs 34 is less than the axial width or thickness of associated ribs 26 and center rings 34.

FIGS. 3 and 4 illustrate a modified wheel 36 embodying this invention utilizing rim 12 and a modified disc or spider 14'. Disc or spider 14' has the outer ring 22 and inner ring 24 of disc or spider 14, but also has a concentric annular rib 38 therebetween. An outer band of non-radially extending ribs 40 interconnect outer ring 22 and annular rib 38 to provide a latticework of ribs defining a circumferentially extending row of generally triangular openings 39 and 39' arranged in alternating nested relationship. An inner band of a plurality of generally circumferentially spaced radially extending ribs 42 interconnects center ring 24 and annular rib 38. Ribs 42 are connected to annular rib 38 at points intermediate (midway between) the connection of ribs 40 to annular rib 38. Webs 34' extend circumferentially between ribs 42 adjacent their inboard edges and extend radially between ribs 24 and 38, each web 34' having a mounting hole 32 extending axially centrally therethrough.

FIGS. 5 and 6 illustrate another modified wheel 44 embodying this invention utilizing the previously described rim 12 and a modified disc or spider 14''. Disc or spider 14'' is generally similar to disc or spider 14' except that ribs 42 of the inner band are each connected to annular rib 38 at a point 46 in radial alignment with the junction of an associated pair of ribs 40 with band 38, rather than intermediate the connections of the ribs 40 to band 38 as in disc or spider 14'.

In all forms of the wheel of the invention illustrated herein the discs or spiders 14, 14' and 14'' provide increased resistance to axial stress on the wheel while minimizing the weight thereof by utilizing a generally frustoconical cross section as shown in FIGS. 2, 4 and 6. This frustoconical shape provides the thinnest cross section adjacent outer ring 22 and the thickest cross section adjacent center ring 24 where the bending moments on the disc due to axial loading on rim 12 of the wheel are the greatest. The stresses transmitted to the webs 34 or 34' and the wheel mounting holes 32 therein are decreased by the connection of the outer band of ribs to the center ring 24 via the inner band of ribs. In other words, interconnecting the outer and center rings 22 and 24 with a plurality of ribs and locating webs 22 outboard of ring 24 provides a wheel disc or spider structure having load lines extending into the heavy center ring via rib sections which in turn isolates the webs 34 or 34' from these load lines and minimizes the live stresses in the area of the bolt mounting holes 32 created by operation of the vehicle on which the wheel is mounted.

All of the forms of discs or spiders 14, 14' and 14'' are preferably made in one piece with homogeneously integral ribs, webs, and inner and outer rings, preferably by casting the discs from materials such as low-medium carbon steel, aluminum or magnesium. The discs are preferably made of cast steel to provide adequate strength in the comparatively thin sections and to facilitate welding of the disc or spider to rim 12 without requiring the casting of ferrous inserts into the body of the disc or spider. The discs are preferably formed so that there is at least 0.055 of an inch interference between outer ring 22 and the central well portion 20 of rim 16 so that the discs or spiders can be press fitted into the rims and fixed thereto by a continuous weld extending around the entire periphery of the disc or spider. Casting of the disc or spider is facilitated by its comparatively short axial dimension and arrangement of the ribs, i.e., the molds for casting discs or spiders 14, 14' and 14'' can be formed from a comparatively simple pattern having a parting line only on one side adjacent the inboard face of the disc or spider. Casting of the disc may also be facilitated by utilizing a center riser and pouring through gates located about one-third of the way radially inwardly from the outer periphery of the disc or spider to keep the thinner sections hot while the pouring is completed.

I claim:

1. A vehicle wheel assembly for a pneumatic tire comprising; a one piece metal spider having continuous outer and center rings concentric with the axis of rotation of said wheel assembly and interconnected by separate outer and inner concentric annular bands of ribs integral with said rings, a plurality of the ribs in said outer band extending non-radially of said wheel assembly and being connected with said outer ring and at least some of the ribs of said inner band to form an open latticework of ribs, at least some of the ribs in said inner band being connected to said center ring and with at least some of the ribs of said outer band of ribs, webs extending circumferentially between and being connected with at least some of the adjacent ribs of said inner band, circumferentially spaced bolt mounting holes extending generally axially one through at least some of said webs for mounting said spider on a wheel hub of a vehicle, said webs having an axial thickness less than both the maximum axial width of their associated ribs of said inner band and the maximum axial width of said center ring, each of said bolt mounting holes being located in its associated web generally radially outward of said center ring and generally circumferentially between adjacent ribs of said inner band associated with its web, said one piece metal spider having a generally frustoconical cross section with a greater axial thickness in cross section adjacent said center ring than the axial thickness in cross section adjacent said outer ring, and a separate metal rim adapted for mounting a pneumatic tire thereon, axially receiving said outer ring of said spider therein and being fixed to said outer ring for rotation with said spider.

2. The wheel assembly of claim 1 in which said spider has a generally frustoconical cross section with the axial width of the ribs in both said inner and outer bands decreasing as the ribs extend outwardly to provide resistance to axial loading of the wheel assembly.

3. The wheel assembly of claim 1 in which said ribs in said outer annular band comprise generally "X" and "Y" shaped configurations alternating circumferentially throughout the circumference of said outer band.

4. The wheel assembly of claim 3 in which the ribs of said inner band extend generally radially outwardly from said center ring with each adjacent pair of ribs of said inner band being connected by one of said webs throughout the circumference of said inner band.

5. The wheel assembly of claim 3 in which said spider has a generally frustoconical cross section with the axial width of the ribs in both said inner and outer bands decreasing as the ribs extend outwardly to provide resistance to axial loading of the wheel assembly.

6. The wheel assembly of claim 1 in which the ribs of said inner and outer bands are interconnected through an annular rib intermediate said outer ring and said center ring.

7. The wheel assembly of claim 6 in which the ribs in said outer band interconnect said outer ring and said annular rib and are arranged in a configuration providing a latticework with a plurality of generally triangular openings.

8. The wheel assembly of claim 6 in which said webs are homogeneously integral with the inboard edges of said annular rib, said center ring and the ribs of said inner band, said webs being offset axially of the disc so as to be inboard of the inboard edge of said outer ring of said disc.

9. The wheel assembly of claim 6 in which the ribs of said inner band extend generally radially and interconnect said center ring and said annular rib.

10. The wheel assembly of claim 9 in which the ribs of said inner band interconnect with said annular rib intermediate the junctions of the ribs of said outer band with said annular rib.

11. The wheel assembly of claim 9 in which the ribs of said inner band each interconnect with said annular rib at points in radial alignment with a junction of an adjacent pair of the ribs in said outer band with said annular rib.

12. The wheel assembly of claim 9 in which said disc has a generally frustoconical cross section with the axial width of the ribs in both said inner and outer bands generally decreasing as the ribs extend outwardly to provide resistance to axial loading of the wheel assembly.

13. The wheel assembly of claim 1 in which said spider is a one-piece metallic casting and said rim is a separate rolled sheet metal part.

14. The wheel assembly of claim 13 in which said rim and spider are made of steel and said rim is fixed to said outer ring of said spider by a weld extending around the entire periphery of said outer ring of said spider.

15. The wheel assembly of claim 14 in which said spider has an interference fit with said rim.

16. A vehicle wheel assembly for a pneumatic tire comprising; a one-piece metal spider having continuous outer and center rings concentric with the axis of rotation of said wheel assembly and interconnected by separate outer and inner concentric annular bands of ribs integral with said rings, a plurality of the ribs in said outer band extending non-radially of said wheel assembly and being connected with said outer ring and at least some of the ribs of said inner band to form an open latticework of ribs, said ribs in said annular outer band having generally X and Y-shaped configurations alternating circumferentially throughout the circumference of said annular outer band, at least some of the ribs in said inner band being connected to said center ring and with at least some of the ribs of said outer band of ribs, webs extending circumferentially between and being connected with at least some of the adjacent ribs of said inner band, circumferentially spaced bolt mounting holes extending generallly axially one through at least some of said webs for mounting said spider on a wheel hub of a vehicle, said webs having an axial thickness less than both the maximum axial width of their associated ribs of said inner band and the maximum axial width of said center ring, each of said bolt mounting holes being located in its associated web generally radially outward of said center ring and generally circumferentially between adjacent ribs of said inner band associated with its web, said one-piece metal spider having a generally frustoconical cross section with a greater axial thickness in cross section adjacent said center ring than the axial thickness in cross section adjacent said outer ring, and a separate metal rim adapted for mounting a pneumatic tire thereon, axially receiving said outer ring of said spider therein and being fixed to said outer ring for rotation with said spider.

* * * * *

PO-1050
(5/69)

UNITED STATES PATENT OFFICE
CERTIFICATE OF CORRECTION

Patent No. 3,807,805      Dated April 30, 1974

Inventor(s) Alexander Brede III

It is certified that error appears in the above-identified patent and that said Letters Patent are hereby corrected as shown below:

Column 2, line 60 - "0.055" should be --0.005--

Column 4, lines 8, 10 and 22 - "disc" should be --spider--

Signed and sealed this 12th day of November 1974.

(SEAL)
Attest:

McCOY M. GIBSON JR.
Attesting Officer

C. MARSHALL DANN
Commissioner of Patents